July 8, 1924.

F. W. SCARFF

GUN MOUNTING

Filed March 20, 1923    5 Sheets—Sheet 1

1,500,726

Inventor
F. W. Scarff
by J. Juscie Atty

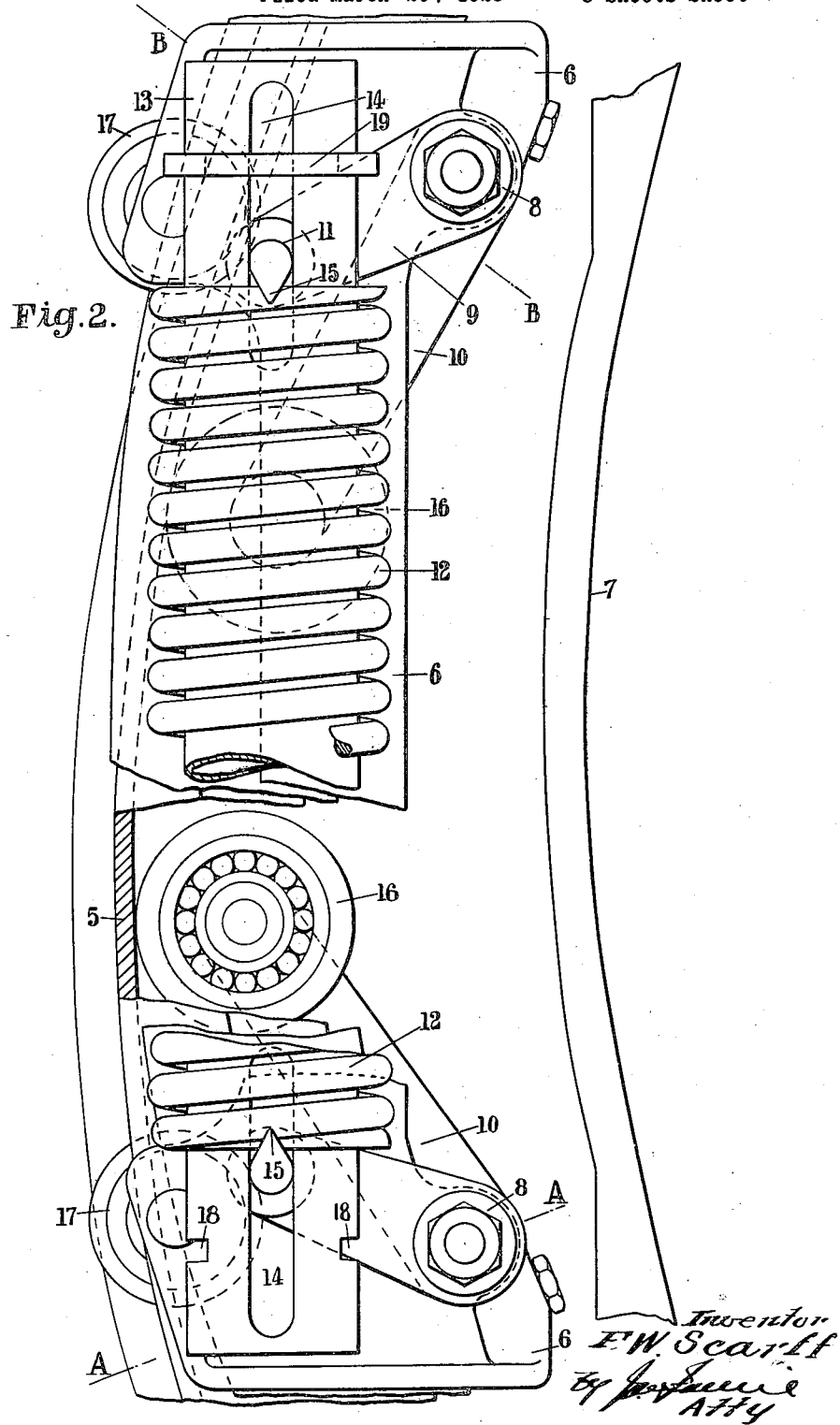

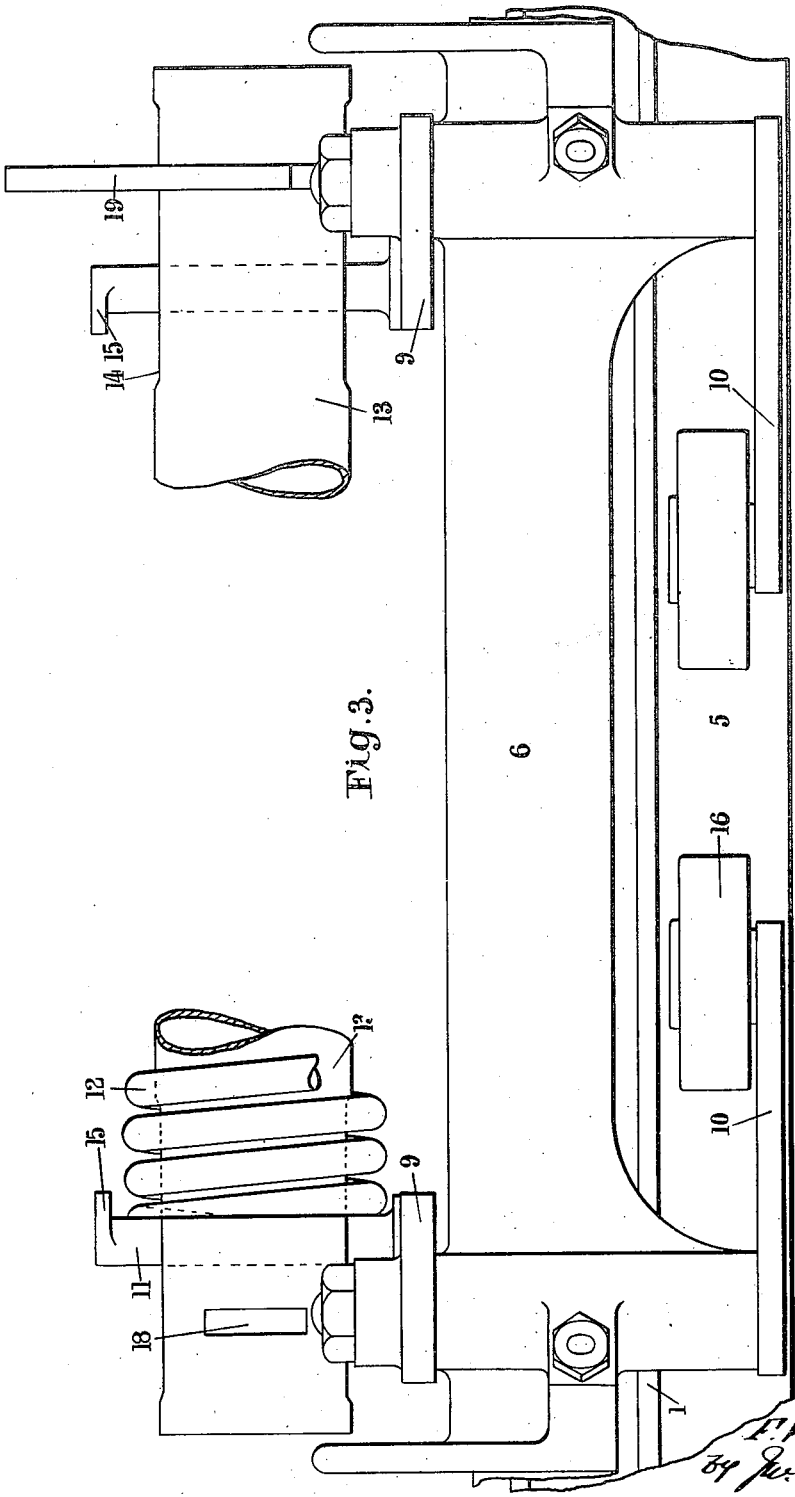

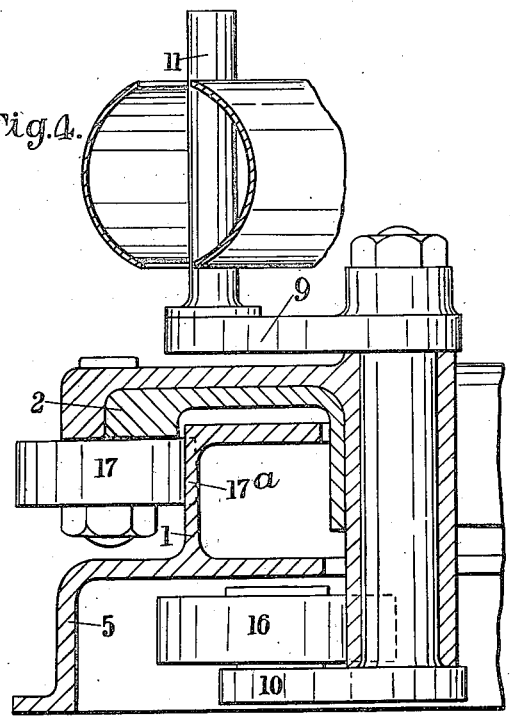
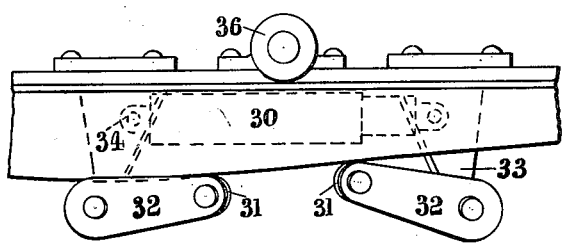
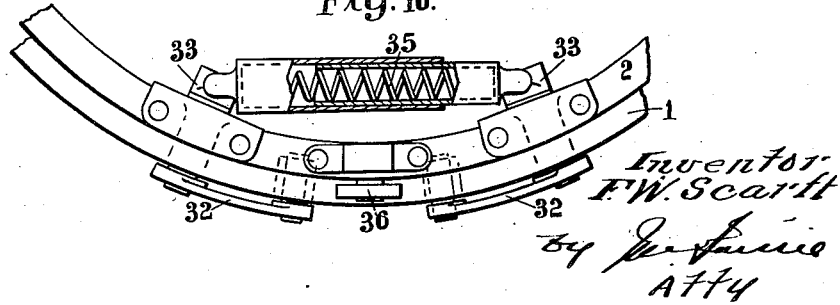

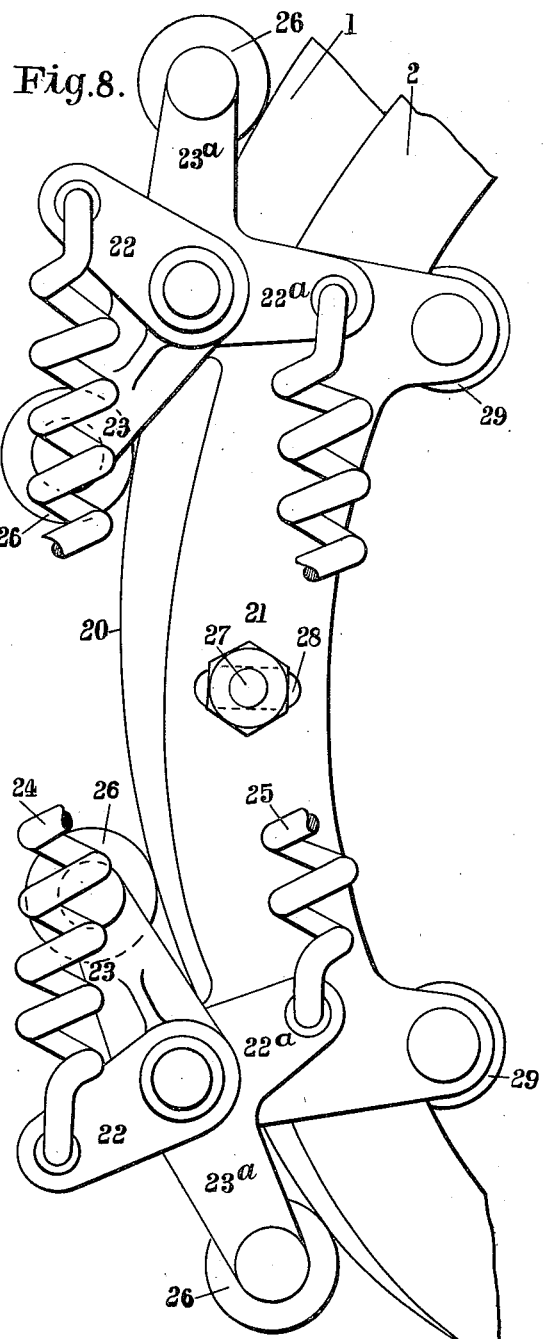

Patented July 8, 1924.

1,500,726

UNITED STATES PATENT OFFICE.

FREDERICK WILLIAM SCARFF, OF LONDON, ENGLAND.

GUN MOUNTING.

Application filed March 20, 1923. Serial No. 626,369.

*To all whom it may concern:*

Be it known that I, FREDERICK WILLIAM SCARFF, a British subject, residing at 18 St. Charles Square, London, England, have invented certain new and useful Improvements in Gun Mountings, of which the following is a specification.

This invention relates to gun mountings for rapidly moving platforms such as aircraft, torpedo boat destroyers, and the like, of the kind in which the gun or guns are carried upon a rotatable ring horizontally movable so as to provide a training through 360°.

With such devices, the effect of wind pressure on the guns, due to the movement of the platform, varies from a minimum when the guns are pointed dead fore or aft to a maximum when the guns are pointed on the beam. The effect of the said wind pressure is very considerable on modern aircraft or even in fast destroyers producing grave inconvenience and fatigue to the gunner and seriously impairing the accuracy of fire.

It is an object of the present invention to provide in such mountings an improved wind-balancing gear whereby is provided a graduated resistance to wind interference which varies according to the training angle.

Generally, the wind resistance varies according to a sin curve of which the abscissæ are the angles of horizontal displacement of the mounting from the fore and aft position. The present invention comprises an improved means providing a wind-balancing force varying with the sin curve of the said angle.

It is a further object of the invention to provide a wind-balancing gear which is wholly carried by and moves with the movable ring of the mounting, no part of it being anchored to a point fixed relatively to the moving platform.

It is a further object of the present invention to provide a wind-balancing gear wherein the strength of the spring elements can readily be changed or increased or diminished to provide a more accurate adjustment for different forces of wind arising from different speeds.

A further object of the invention is to provide a wind-balancing gear wherein the increment of the balancing turning movement can be accurately controlled by means of an element displaced by an inclined or cam-shaped track during rotation of the ring.

Further objects are to provide a wind-balancing gear wherein a smooth and gradual action without jerking is always effected, and to provide a gear wherein risk of breakage and delay is reduced to a minimum.

These and other objects of the invention will be more particularly made apparent in the subjoined description wherein:—

Figure 1:
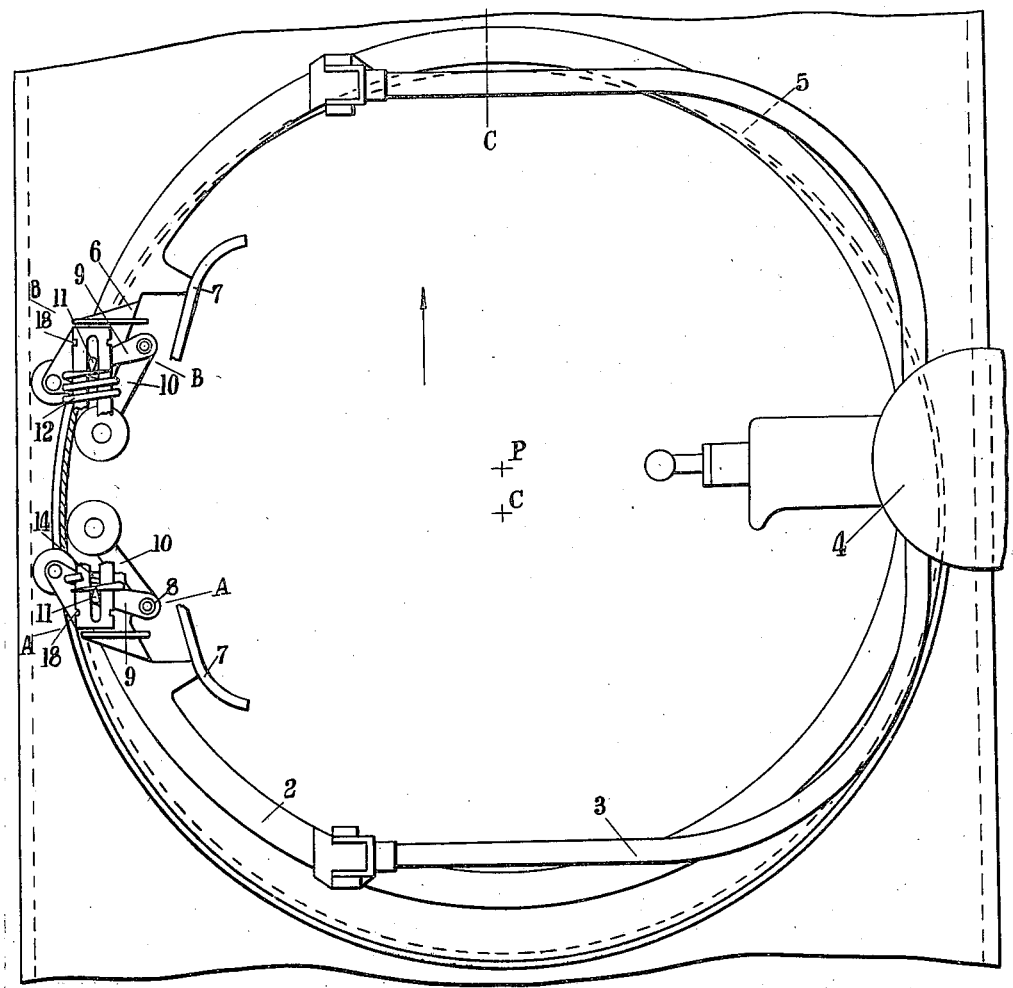
Figure 5:
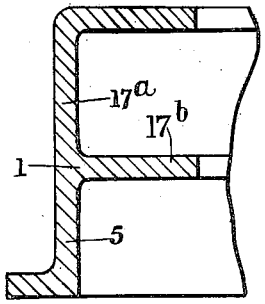
Figure 6:
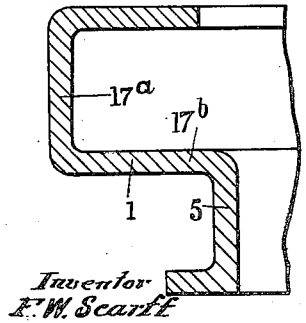
Figure 7:
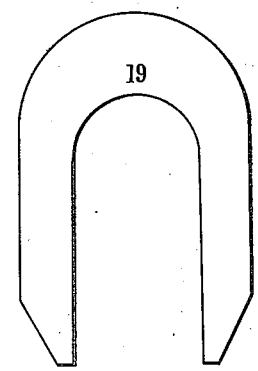

Figure 1 is a plan view in part section of an aircraft gun mounting complete with apparatus in accordance with the present invention. In this figure the gun is shown pointing on the beam being rotated clockwise from the fore position. Figures 2 and 3 are respectively part sectional plan and part sectional elevation of the apparatus drawn to a larger scale. Figure 4 is a vertical section on the line A—A of Figure 2. Figures 5 and 6 are sections of a part taken on the lines B—B of Figs. 1 and 2 and C—C of Figure 1 respectively. Figure 7 is a view of a detail. Fig. 8 is a plan view of an alternative form and Figs. 9 and 10 are respectively elevation and plan views of a further alternative form.

Referring to Figures 1 to 6, 1 designates a ring fixed to the fuselage of the aircraft or other rapidly-moving platform such as a ship's gun platform. 2 is a rotating ring movably mounted on the ring 1 by means of rollers, 3 the elevating arm or yoke pivoted to the ring 2, and 4 is a gun mounted on the elevating arm. The ring 2 is mounted on the ring 1 by a plurality of rollers which roll on the flange $17^b$, Fig. 4, of the said ring 1. It is, of course, obvious that more than one gun may be mounted on the elevating arm. Formed integral with the fixed ring, is an eccentric inclined or cam-shaped track 5, which is itself circular but its eccentricity is so arranged that its maximum and minimum displacements with respect to the centre of the mounting correspond to the fore and aft line of the aircraft. Its rate of change of slope, however, relatively to the centre of the mounting is maximum on both beams and zero fore and aft. Obviously, the track may if desired be formed separately and mounted in any suitable manner so as to be fixed relatively to the ring 1.

In Figure 1, P is the centre of the mounting and C is the centre of the eccentric track 5.

Fixedly secured on the rotating ring is a supporting plate or frame 6, in front of which is the usual padded back rest 7 for the gunner which moves with the ring 2. At each end of the plate 6 is a bearing rotatably housing a vertical spindle 8 carrying a bellcrank or compound lever 9, 10. Each member 9 is provided with a vertical pin 11, and between the two pins a compression spring 12 is mounted. To keep the spring 12 in place, it is mounted on a tube 13 slotted at each end as at 14, to slip over the aforesaid pins 11 and to allow relative movement of the pins within the slots 14, the pins being flanged as at 15, Figure 3, to retain the ends of the spring in position. Each member 10 is provided at its extremity with a roller 16 which conveniently may run on a ball or roller race, and each roller engages on the inside of the track 5.

The arrangement is such that when the ring 2 is rotated to train the gun or guns, the rollers 16 are displaced towards or away from the centre of the mounting and such displacement, acting through the bell-crank levers 9, 10, causes a corresponding approach or separation of the pins 11 thus increasing or decreasing the compression of the spring. Thus the spring provides a uni-directional braking effect against the pressure of the wind on the gun barrel when directed off the fore and aft line, and further provides a uni-directional restoring force assisting the gunner to bring back the gun to the forward position, the direction being always such as to counterbalance wind-pressure on the barrel. It will be realized that at any given angular position of the ring 2, the amount of the said braking movement or restoring-force will be determined by the increment of change in the effective length of the spring 12 for each increment of change in the angular position of the ring, and that this effect will at each point be determined by the slope of the cam-shaped track at the points of contact with the rollers 16 and not by its absolute displacement from the centre of the ring. For instance, maximum compression of the spring occurs when the gun is pointing dead aft, but at this point the wind balancing gear provides no braking action or turning-movement since the radial movement of the two rollers 16 is self-compensating. Thus at any point during 360° of movement of the ring 2, the braking effect or restoring force varies according to the slope of the operative elements of cam-shaped track at the point, and by suitable design of track can be caused to follow a sin curve with great exactitude.

To prevent any tendency of the plate 6 with its associated gear to cant or displace in a vertical plane, guide rollers 17 are provided on the plate 6 to run on a concentric part 17ᵃ of the fixed ring 1, Figures 4, 5 and 6.

For ease in assembling the spring 12 and the guide tube 13 on the other parts of the gear, the guide tube is at each end provided with a pair of vertical slots 18, the pairs of slots being sufficiently distant to accommodate the spring between them without substantial compression. After the spring 12 has been placed on the tube, an inverted U-shaped clip 19, Figures 2 and 7 is inserted in each pair of slots, the spring being positioned between the said clips. The tube is then placed by means of its slots 14 over the pins 11 and the mounting is then turned until the pins 11 passing beneath the upper vertical arms of the clips engage the projecting ends of the spring 12 further compressing the spring and so permitting the withdrawal of the clips 19. Contrariwise, when a spring is in position and under substantial compression, by inserting the clips 19 in the aforesaid slots 18 and rotating the mounting so as to release the spring 12, it will ultimately abut against the clips 19, whereupon after slight further movement of the mounting, the spring and guide tube can be removed readily, either for replacement by a spring of different strength or for any repair work that may be necessary.

Thus, a number of tubes and of springs of different strengths may be carried by the gunner and changes effected in a very short time as may be found desirable. By varying the strength of the spring element, either by substitution or addition, the sin curve of the restoring force can be made to coincide with substantial accuracy with the sin curve of wind pressure on the barrel.

Referring now to Figure 8, the inclined track 20 is arranged exteriorly of the fixed ring 1, and on the rotating ring 2 is fixed a supporting plate 21 having at each end a pair of bell cranks 22, 23 and 22ᵃ and 23ᵃ, the two bell cranks of each pair being rotatable on a common centre. The two members 22 are cross connected by a tension spring 24 and the two members 22ᵃ are similarly cross connected by a tension spring 25. Each member 23, 23ᵃ is provided with a roller 26 at its extremity to run on the track 20. To allow of a certain amount of play, the fixing bolt 27 from the plate 21 passes through an elongated hole 28 in the rotating ring, and to prevent canting, guide rollers 29 are provided on the plate 21 to run on the inside of the fixed ring. It will be observed that displacement of the rollers 26 from the centre of the ring increases the tension on the springs 24, 25, and the track is arranged so that as the guns move from dead ahead towards the beam, with increase of wind pressure tending to turn the gun or guns to the rear, the rate of displacement of the rollers from the centre of the ring increases. Further, when turning the gun or guns in the reverse sense against the wind, the rollers tend to run down the inclined path under the tension in the springs, thus assisting the gunner in turning the mounting with the gun or guns against the wind.

The track 20, Figure 8, differs somewhat from the track 5 Figures 1 to 4, in that two inclined surfaces and two concentric surfaces are provided, so disposed that when no turning or braking effort is required on the mounting, (i. e., when the guns are directed fore or aft) all four rollers are on a concentric path. As the braking or turning effort is required first one, then two, then three, then four rollers reach the inclined surface and so successive increments of the rate of displacements take place, until when the mounting has been rotated for the gun or guns to point on the beam, all four rollers have been displaced from the centre of the mounting. Similarly in turning the mounting for the gun or guns to point from the beam towards the fore and aft line, first one, then two, then three, then four rollers engage concentric portions of the track 20, as training of the mounting proceeds, thus diminishing as required the effective braking effect or turning movement.

Referring now to Figures 9 and 10, the inclined track instead of being arranged horizontally around the fixed ring, is arranged vertically with respect to it. 30 is the inclined track, 31 the rollers running on the same and carried by bell cranks 32, 33 which are pivoted to brackets 34 secured to the rotated ring and cross connected by a spring 35. The free ends of the bell cranks form the ball elements of ball and socket joints whereof the socket elements are carried by sliding tubes having closed outer ends between which the compression spring is arranged. To prevent canting the guide roller 36 on the rotating ring engages with the fixed ring.

It is obvious that in order to provide for different air speeds of the travelling platforms, replaceable inclined surfaces of different pitch may be used. Where springs of different strengths are employed, the strength of the springs can be graduated for air speeds. In the modification of Figures 1 to 6 one or more additional springs may be carried, concentric with the spring 12, either inside or outside tubular guide.

It will be obvious that changes may be made in the design and detail arrangements of the various parts above described without departing from the scope of this invention. For example, a combination of one or more external inclined surfaces and one or more internal inclined surfaces may be employed, with spring roller mechanisms engaging both surfaces and suitably cross connected, so that a roller running on the exterior surface is cross connected to a roller running on the interior surface. Further, instead of springs, fluid-containing cylinders with pistons may be used, the displacement of the rollers effecting relative movement between the cylinders and pistons, to store up or release energy in the fluid in the cylinder for the purpose specified.

It is to be understood that in the above specification and following claims, the movement of the mounting described as being in a horizontal plane is intended broadly to cover the training of the gun in azimuth at times when the moving platform is inclined to the horizontal, for example, when an aeroplane is soaring or diving.

I claim:

1. In a gun mounting, a ring rotatable in azimuth means for mounting a gun on said ring, means including a cam track for providing a graduated resistance or assistance to rotation of said ring, said means being operative throughout the whole range of movement of said ring and providing a uni-directional effect tending to counterbalance wind pressure on the gun due to its angular position relatively to the direction of movement of the mounting.

2. In a gun mounting, a ring rotatable in azimuth means for mounting a gun on said ring, means including a cam track for providing a graduated resistance or assistance to rotation of said ring, said means including a coiled spring controlled by said cam track and being operative throughout the whole range of movement of said ring and providing a uni-directional effect to counterbalance wind pressure on the gun due to its angular position relatively to the direction of movement of the mounting.

3. In a gun mounting, a ring rotatable in azimuth means for mounting a gun on said ring, means including a cam track for providing a graduated resistance or assistance to rotation of said ring, said means including a compression spring controlled by said cam track and being operative throughout the whole range of movement of said ring and providing a uni-directional effect to counterbalance wind pressure on the gun due to its angular position relatively to the direction of movement of the mounting.

4. In a gun mounting mounted on a movable platform a ring rotatable in azimuth, means for mounting a gun on said ring, a wind-balancing gear tending to counter-balance wind pressure on the gun due to its angular position relatively to the direction of movement of the platform, said gear comprising a lever carried by the ring and pivotally mounted thereon, a cam-shaped track eccentric to the axis of rotation of the ring, a pressure-resisting element, and means whereby rotation of the ring in one sense causes the cam-shaped track to deflect the lever so as to apply pressure to said pressure-resisting element.

5. A gun mounting mounted on a movable platform comprising a member rotatable in azimuth on said platform, means for mounting a gun on said member, an element carried by said gun-supporting member and moving therewith, a co-acting element in the form of a cam track carried by a part fixed relatively to said platform, an energy storing and restoring means, and means whereby on rotation of the gun-supporting member, the coacting-elements interengage so as to operate said energy storing and restoring means.

6. A gun mounting mounted on a movable platform comprising a member rotatable in azimuth on said platform, means for mounting a gun on said member, a hinged element carried by said gun supporting member, a track cam-shaped relative to the circular path of the point of support of said hinged element, an energy storing and restoring device, means whereby on rotation of said gun supporting member in one sense the hinged element is rocked by said track and operates said device, and in the opposite sense is allowed to be rocked by said device.

7. A gun mounting mounted on a movable platform comprising a member rotatable in azimuth on said platform, means for mounting a gun on said member, a hinged rocking element carried by said gun-supporting member and capable of rocking relatively thereto in azimuth, a fixed vertical cam-shaped track eccentric to the centre of rotation of said gun supporting member, an energy storing and restoring device operatively connected to said rocking member, said rocking member being maintained by said device in contact with said track so as to operate said device during movement of the gun supporting member in one sense, and being caused by said track to operate said device during movement of the gun in the opposite sense.

8. A gun mounting mounted on a movable platform comprising a member rotatable in azimuth on said platform, means for mounting a gun on said member, wind-balancing gear including a cam track tending to counterbalance wind pressure on the gun due to its angular position relatively to the direction of movement of the platform, said gear being carried by and rotatable with said rotatable gun-supporting member.

9. In a ring mounting for aircraft guns, a fixed ring, a movable ring rotatable thereon, wind balancing gear including a cam track for counterbalancing wind pressure on the gun due to movement of the aircraft, said wind-balancing gear being carried by and rotatable with said movable ring.

10. In a ring mounting for aircraft guns, a fixed ring, a movable ring rotatable thereon, wind balancing gear for counterbalancing wind pressure on the gun due to movement of the aircraft, said wind-balancing gear being carried by and rotatable with said movable ring and being operated by the movement of a rocking lever hinged to the movable ring, the free end of said lever being engaged by a cam-shaped fixed track inclined to the normal free circular track of the lever.

11. A gun mounting adapted to be mounted on a moving platform comprising a ring rotatable in azimuth on said platform, means for mounting a gun on said ring, a cam-shaped track fixed relatively to said platform and eccentric relatively to said ring, a vertical spindle carried by said ring, a bell-crank lever mounted on said spindle, one end of said lever being in contact with said track, a coiled spring, means whereby said track, a coiled spring, means whereby movement of said bell-crank lever caused by rotating it along the face of said track by means of said rotatable ring causes said spring to brake or assist rotation of said ring according to the direction of said rotation.

12. A gun mounting adapted to be mounted on a moving platform comprising a ring rotatable in azimuth on said platform, means for mounting a gun on said ring, a cam-shaped track fixed relatively to said platform and eccentric relatively to said ring, a pair of spindles mounted on said ring, a bell-crank lever mounted on each spindle, one end of each bell-crank being in contact with said cam-shaped track the other end of said cranks each carrying an abutment, a compression spring mounted between said abutments, said abutments being caused to approach each other when the rotation of the ring moves the operative ends of the levers along the track face in one direction and allowed to recede when the ring moves the levers along the track face in the opposite direction.

13. A gun mounting carried by a moving platform, a gun-supporting member rotatable in azimuth, a cam-shaped track arranged eccentrically to the axis of rotation of the gun-supporting member, roller mechanism carried by said member in engagement with the operative surface of said track, an energy storing and restoring device, means whereby energy is stored in said device when the mechanism rolls along the track in one direction and whereby energy is restored from said device when the mechanism is rolled along the track in the other direction.

14. In a gun mounting carried by a moving platform, a fixed ring mounted on said platform a movable gun-supporting ring rotatable in azimuth on said fixed ring, a circular vertically-faced track formed integrally with said fixed ring and eccentrically thereto, means carried by said movable ring engaging the face of said track, and energy storing and restoring means operated by radial movement of said means caused or permitted by the said track during rotation of said means with said movable ring.

15. In an energy storing and releasing device comprising a compression spring positioned between two movable abutment pins, a guide tube for said spring having slots in which said pins move, and means adapted to be fixed to said tube permitting the passage of said pins but preventing the passage of the ends of said spring.

In testimony whereof I affix my signature.

FREDERICK WILLIAM SCARFF.